United States Patent [19]
Patino et al.

[11] Patent Number: 5,606,241
[45] Date of Patent: Feb. 25, 1997

[54] APPARATUS FOR DETERMINING RADIO STATE DURING CHARGING IN ORDER TO PROVIDE CHARGE COMPENSATION

[75] Inventors: Joseph Patino, Pembroke Pines; Henry A. Bogut, Coral Springs; Arthur G. Burns, Plantation, all of Fla.

[73] Assignee: Motorola, Inc., Schaumburg, Ill.

[21] Appl. No.: 292,952

[22] Filed: Aug. 22, 1994

[51] Int. Cl.[6] .................................................. H01M 10/48
[52] U.S. Cl. .......................................................... 320/48
[58] Field of Search .................................. 320/30, 39, 40, 320/48, 31, 35; 429/90

[56] References Cited

U.S. PATENT DOCUMENTS

| | | | |
|---|---|---|---|
| 4,468,605 | 8/1984 | Fitzgerald | 320/36 |
| 4,673,861 | 6/1987 | Dubovsky et al. | 320/2 |
| 4,684,870 | 8/1987 | George et al. | 320/20 |
| 4,709,202 | 11/1987 | Koenck et al. | 320/43 |
| 4,724,528 | 2/1988 | Eaton | 320/43 X |
| 4,737,702 | 4/1988 | Koenck | 320/40 |
| 4,740,754 | 4/1988 | Finger | 320/48 X |
| 4,742,290 | 5/1988 | Sutphin et al. | 320/21 |
| 4,746,854 | 5/1988 | Baker et al. | 320/40 |
| 4,912,391 | 3/1990 | Meadows | 320/2 |
| 5,150,031 | 9/1992 | James et al. | 320/2 |
| 5,184,059 | 2/1993 | Patino et al. | 320/15 |
| 5,200,688 | 4/1993 | Patino et al. | 320/13 |
| 5,206,097 | 4/1993 | Burns et al. | 320/48 X |
| 5,298,346 | 3/1994 | Gyenes | 429/90 |

*Primary Examiner*—Edward H. Tso
*Attorney, Agent, or Firm*—Scott M. Garrett; Kenneth M. Massaroni

[57] ABSTRACT

A battery charging system includes a battery pack (106) and charger (102). Battery pack (106) includes a selectable magnetic field generator (202) which is activated by radio controller (206) when radio (104) changes states. A Hall-effect switch (204) located in either charger (102) or battery (106) receives the magnetic field and informs charger monitor circuit (128) that radio (104) has changed states. This allows for charger (102) to modify the amount of current being provided to radio (104) via line (129). In a second embodiment, an infrared source (402) and an infrared detector (404) are used in place of selectable magnetic field generator (202) and Hall-effect switch (204).

9 Claims, 6 Drawing Sheets

APPARATUS FOR DETERMINING RADIO STATE DURING CHARGING IN ORDER TO PROVIDE CHARGE COMPENSATION

TECHNICAL FIELD

This invention relates in general to battery charging systems and more specifically to an apparatus for determining changes in radio state and compensating for such changes during the charging of the radio battery.

BACKGROUND

It is very common for battery packs which are used in portable communication devices, such as two-way radios, to have a thermistor and a battery capacity resistor. The thermistor is used by a battery charger during the charging of the battery, to determine if the battery is being charged properly. While the capacity resistor is used by the charger to determine the capacity of the battery, prior to the battery being charged. The battery charger upon determining the battery capacity (e.g., 1000 milli-amp-hour maH, etc.) will select the proper charging rate to use, in order to optimally charge the battery pack.

Referring to FIG. 1, there is shown a prior art battery charging scheme consisting of a charger 102, radio battery pack 106 and radio 104. Radio 104 contains positive (B+) and negative (B−) battery terminals which are coupled to radio battery 106 via battery contacts 116 and 114, respectively. Battery 106 contains one or more battery cells 108, which determine the voltage and current capacity of battery 106. Also included as part of the battery 106, are protection diode 118, a battery temperature indicator such as thermistor (Rt) 112 and a battery capacity indicator, such as resistor (Rc) 110.

Charger 102 consists of a charger monitor circuit 128, which can consist of a well known microprocessor or microcontroller as known in the art and appropriate control software. Charger monitor circuit 128 controls charger control circuit 130 which provides current to battery 106 in order to charge the battery. A control signal is transmitted by charger monitor circuit 128 to charger control circuit 130 via bus 140, the control signal informs charger control circuit 130 on how much current to source via line 129 to battery 106.

Charger monitor circuit 128 contains three analog to digital (A/D) ports 120, 122 and 124. A/D port 120 monitors the voltage on the B+ line. A/D port 122 senses the resistance of capacity resistor Rc 110 and A/D port 124 in turn senses the resistance of thermistor Rt 112, as its resistance changes once the battery begins charging. A/D ports 122 and 124 include external pull-up resistors which are used to determine the resistance of Rc 110 and Rt 112, by determining the voltage level at A/D ports 122 and 124, respectively.

The problem with the prior art charger system shown above is that typically, if the radio is turned "on", the radio standby current requirements are greater than the trickle charge current that a charger supplies to the battery. This problem is worsened in newer battery technologies such as Nickel Metal Hydride which are more sensitive to overcharge and therefore typically require lower trickle charge rates. Thus, a battery being charged with an attached radio that is left in the "on" condition, begins losing charge. The problem worsens if the user places the radio in a transmit mode or if a message is received by the radio causing the radio to enter into it's receive mode. In both the receive and transmit mode, the battery being charged loses even a greater amount of charge.

Most battery chargers for portable radios typically only include a limited number of lines which connect the charger to the battery under charge. For example, charger 102 and battery 106 have 4 lines connecting the charger 102 and battery 106. These lines being B+ line 132 which provides the charging current to the battery pack, Rc line 134 which is used to sense the capacity resistor 110, thermistor sense line 136 is used to sense battery temperature via changes in the resistance value of thermistor 112, and B− (ground) line 138. In most prior art battery charger systems there is no way for the charger to determine that the radio has changed state (e.g., the radio has been turned on, radio is receiving information, etc.) while the radio battery is being charged. Thus a battery being charged with an attached radio that is left on can actually discharge instead of charge. This is compounded further if the radio in the charger goes into the receive or transmit mode. Hence a means to compensate the battery for the additional radio state dependent current drain is necessary to assure that the battery is charged and maintained properly.

Presently, only vehicular adapters have this current compensation capability. This is because vehicular radio adapters interconnect to the radio's universal connector which allows for the monitoring of the radio data bus to determine the state of the radio. Once the state of the radio is determined, the proper compensation current can be supplied to the battery to offset for the radio's additional current drain. Desk top chargers until now have not had this capability due to the added expense required in interconnecting to the radio's universal connector. A need thus exists in the art for providing a simple and cost effective way of providing for radio state information to be sent to the charger while the radio battery is being charged. The apparatus provided also preferably should maintain the easy "drop in the charger" interface provided by present day desk top battery chargers.

DETAILED DESCRIPTION OF THE PREFERRED EMBODIMENT

Figure 1:
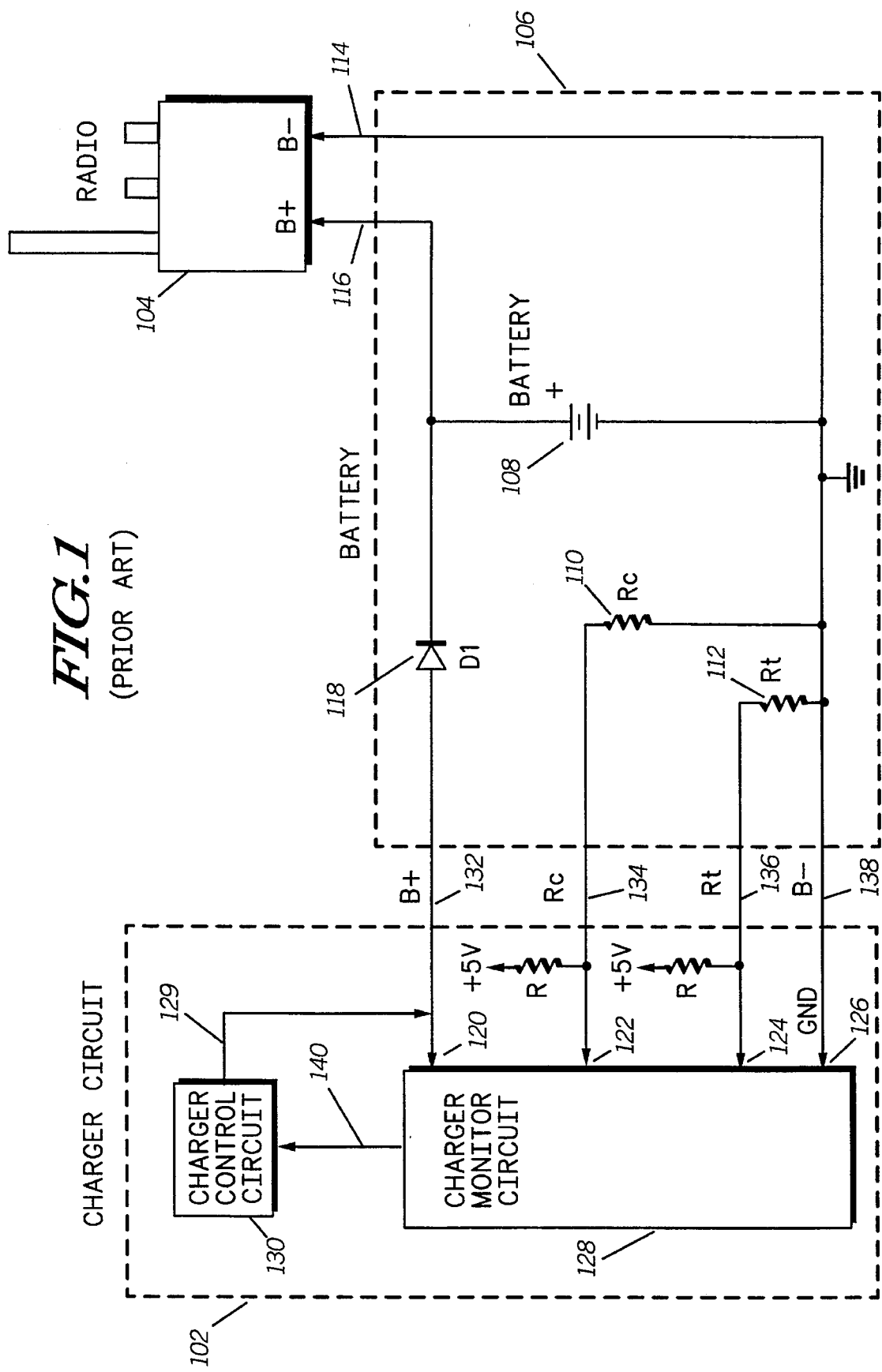
FIG. 1 is a schematic of a prior art battery charging system.
Figure 2:
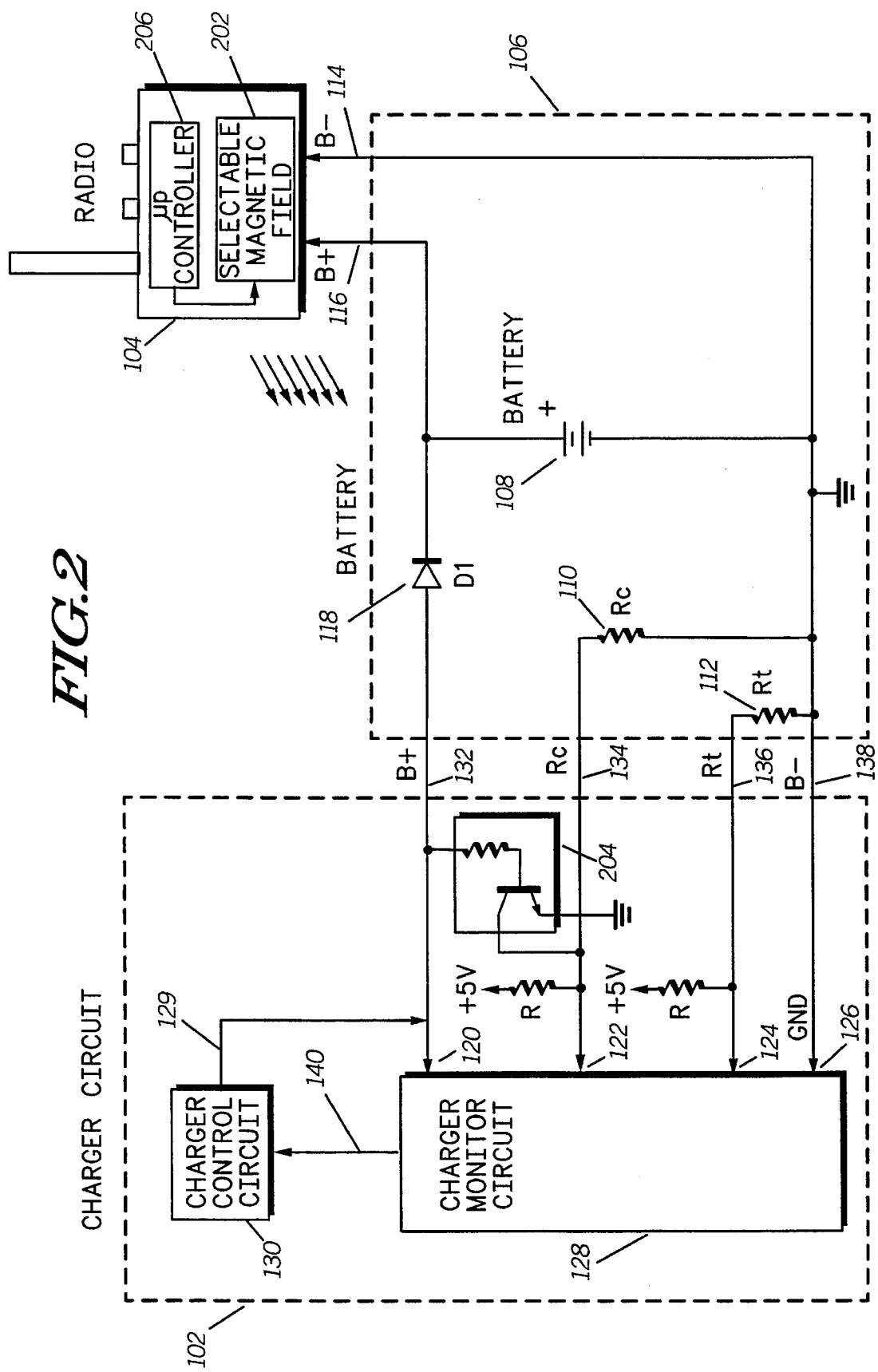
FIG. 2 is a battery charging system in accordance with the present invention.

Referring now to the drawings and specifically to FIG. 2, there is shown a battery charging scheme in accordance with the present invention. For ease of explanation, only those added features provided by the present invention over the prior art charging system shown in FIG. 1, will be discussed in reference to FIG. 2. Added to the battery charging system of FIG. 2 is a selectable magnetic field 202 which is located within radio 104. Selectable magnetic field 202 can take the form of a solenoid or other type of controllable magnetic field. Located in charger circuit 102 is found a Hall-effect switch 204 which is located preferably within battery charger 102 and in magnetic field proximity to the magnetic field generated by the selectable magnetic field 202. Hall effect switch 204 is electrically coupled to B+ and ground as well as A/D port 122 (Rc port).

Operationally, after the capacity of the battery 106 is determined by charger monitor circuit 128 by determining the value of capacity resistor 110, A/D port 122 is used to monitor for changes in voltage level. The pull-up resistor causes A/D port 122 to be maintained at close to the five volt voltage level. However, once the charger 102 begins charging battery 106, charger circuit 128 monitors for changes in voltage level at A/D port 122. If the radio 104 changes radio state, for example is turned "on", a radio state identification signal is generated by selectable magnetic field circuit 202 activating Hall-effect switch 204. This in the preferred embodiment causes A/D port to be pulled low to substantially ground potential. Charger monitor circuit 128 which is monitoring A/D port 122 determines that the voltage level at the port has dropped and then uses this information to adjust the current level being provided by charger control circuit 130 in order to compensate for the increase current drawn by radio 104.

Figure 6:
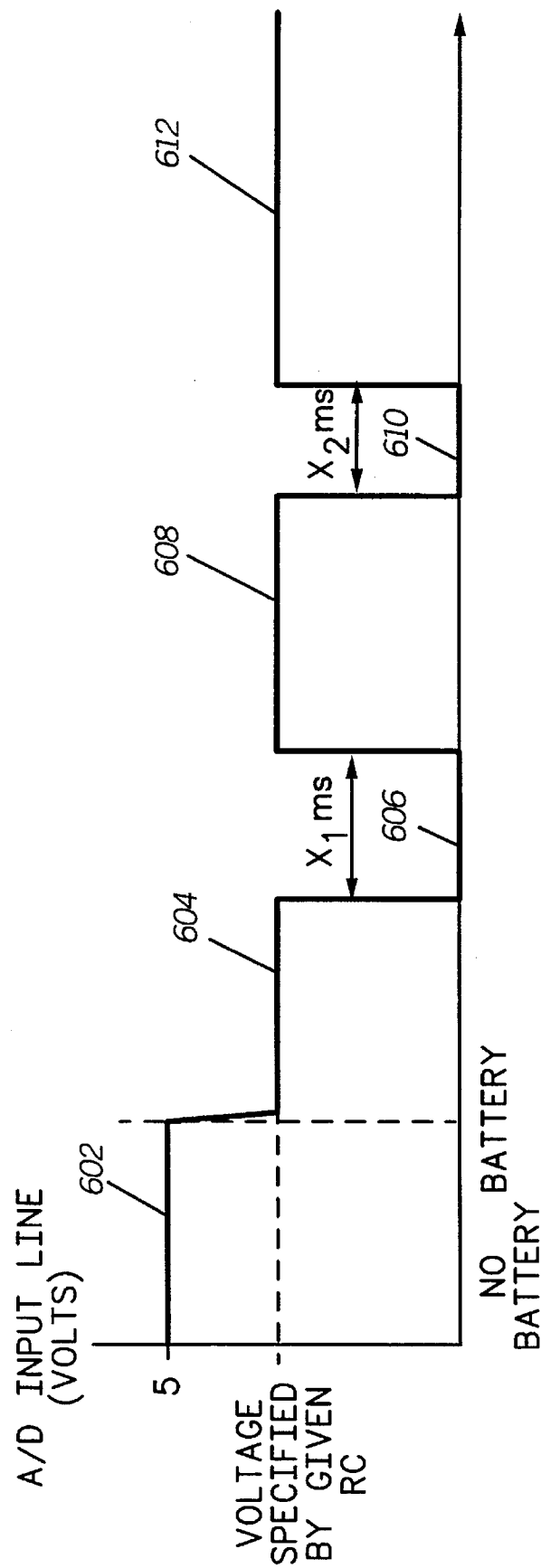
FIG. 6 is a graph showing the radio state information signal which is provided to the charger in accordance with the invention.

In FIG. 6, a graph showing the voltage at the charger control circuit A/D port 122 is shown. At time period 602 when no battery is inserted at charger 102, the voltage at port 122 is equal to approximately supply voltage (5 volts) due to the pull-up resistor coupled to line 134. At time period 604, battery 106 is inserted into the charger, and the voltage at port 122 drops to the specific voltage generated by the voltage divider formed by the pull-up resistor and capacity resistor 110. During time period 606, the Hall-effect switch 204 is activated by magnetic field generator 202 in order to provide a radio state information signal. The radio state information signal is provided when the radio is no longer in the "off" state. Preferably, the amount of time that the Hall-effect switch 204 is activated by magnetic field generator 202 in order to maintain port 122 at ground potential is dependent on the present state of the radio.

Table 1 shows the relationship between the radio state and the amount of time port 122 is maintained in a grounded state, which in effect defines to charger 102 the amount of compensation current which is to be provided.

TABLE 1

| Radio State | Time (milliseconds) | Compensation |
|---|---|---|
| Transmit Hi Pwr | 5 | 1.5 amperes |
| Transmit Low Pwr | 10 | 1.0 amperes |
| Receive | 15 | 200 milliamperes |
| Stand-by | 20 | 100 milliamperes |

For example, if radio 104 is being charged and is maintained in the "off" state, the hall effect switch 204 is not activated by magnetic field generator 202. In this scenario, the charger 102 will continue to trickle charge battery 106 after the charge sequence has been completed. Typically, the trickle charge rate is set at about capacity of the battery divided by 20 (C/20). So a 1500 milli-amphere-hour battery would be trickle charged at a rate of approximately 75 milli-amperes. However, in accordance with the present invention, if during the charging of radio 104 the radio is turned "on", as for example in time period 606, the radio controller 206 located within radio 104 determines that the radio 104 is turned on and causes the selectable magnetic field to be turned on for a period defined in Table 1, in this case for 20 milliseconds. This in turn causes the Hall-effect switch 204 located in charger 102 to become activated for 20 milliseconds providing the radio information signal. The controller located within radio 104 will periodically determine the current radio state and provide for activation of the selectable magnetic field. Preferably, this is done every second or few seconds.

Charger monitor circuit 128 monitors the port 122 in order to check for changes in radio state. Preferably, port 122 is polled every millisecond to see if any changes in voltage have occurred. If after a predetermined period of time such as a second or a few seconds have has elapsed and no new radio information signal has been provided to port 122, charger 104 goes back to the standard trickle charge rate, in the example above, back to a rate of C/20.

If after less than 1 second has elapsed, a new radio state information signal 610 is provided having a period equal to 10 milliseconds, the radio charger 104 changes its charge rate to 1.0 ampere. However if after a second has passed and no new radio information signal is provided during time period 612, the charger 104 reverts back to the trickle charge rate since the radio is no longer transmitting and therefore is no longer in need of a compensation charge current.

Figure 3:
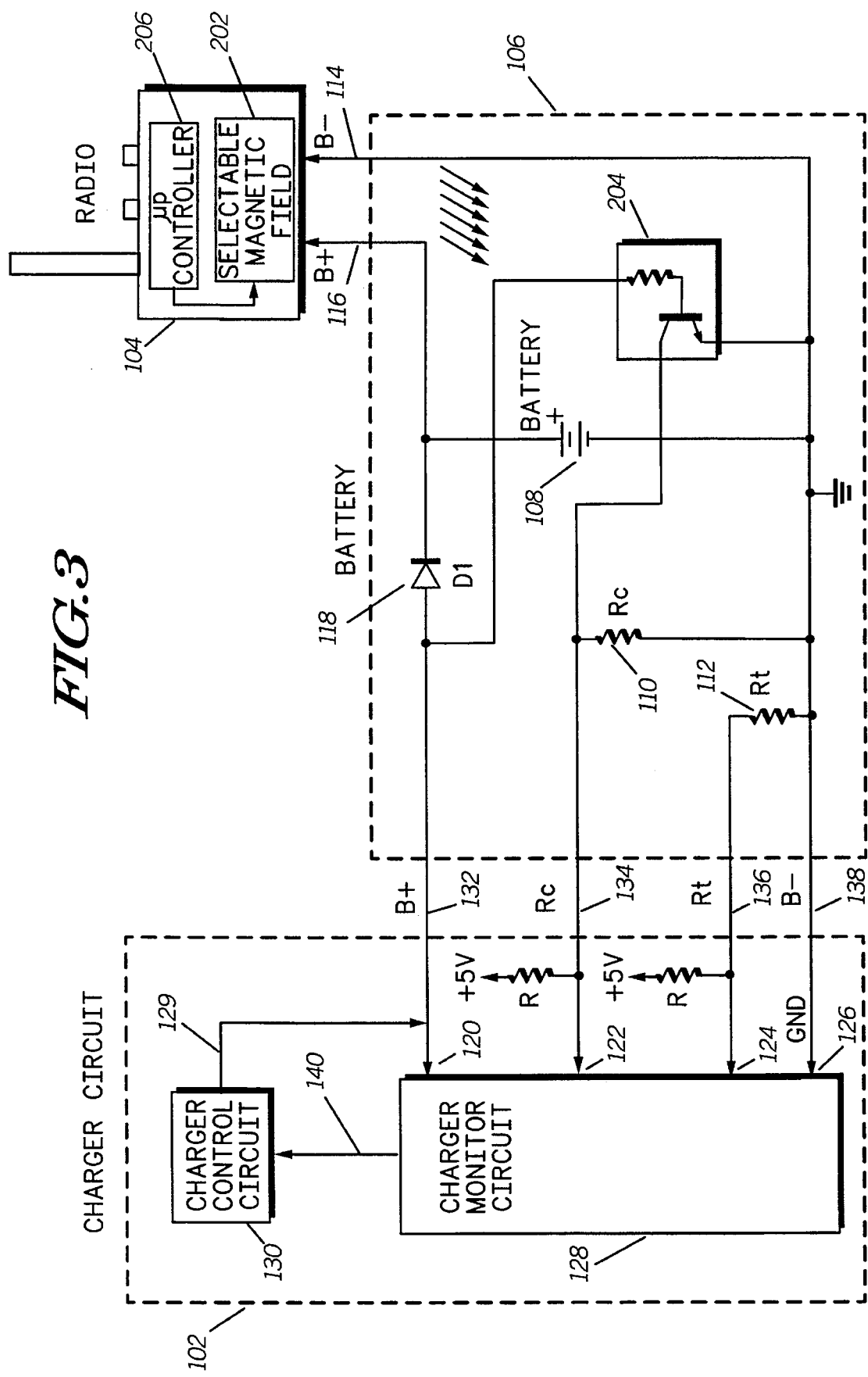
FIG. 3 is a second embodiment of a battery charging system in accordance with the invention.

In FIG. 3, a similar charging system as shown in FIG. 2 is provided except that the Hall-effect switch 204 is placed inside of battery 106 instead of within charger circuit 102. The benefit to this approach is that the charger's physical design is not altered. Only a change in the charger's software is required in order to perform the polling of port 122 and for providing for changes in the charge current based on the reception of radio state signals. The approach shown in FIG. 2 has the main advantage in that no changes to battery 106 are required. The approach requires that charger 102 include a Hall-effect switch 204 which is in proximity to the magnetic field generated by magnetic field generator 202 when radio 104 is placed within the charger 102.

Figure 4:
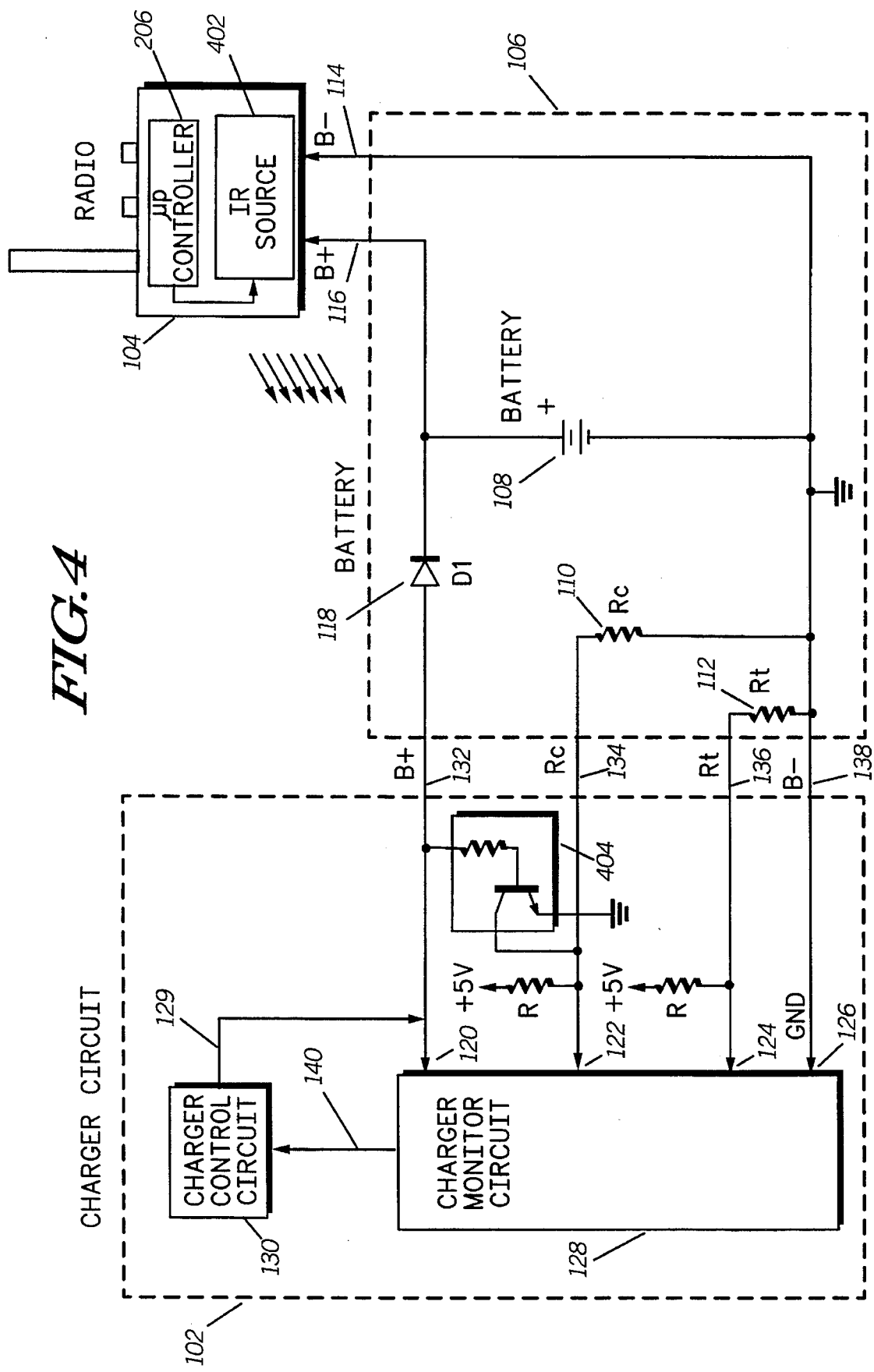
FIG. 4 is a third embodiment of a battery charging system in accordance with the invention.
Figure 5:
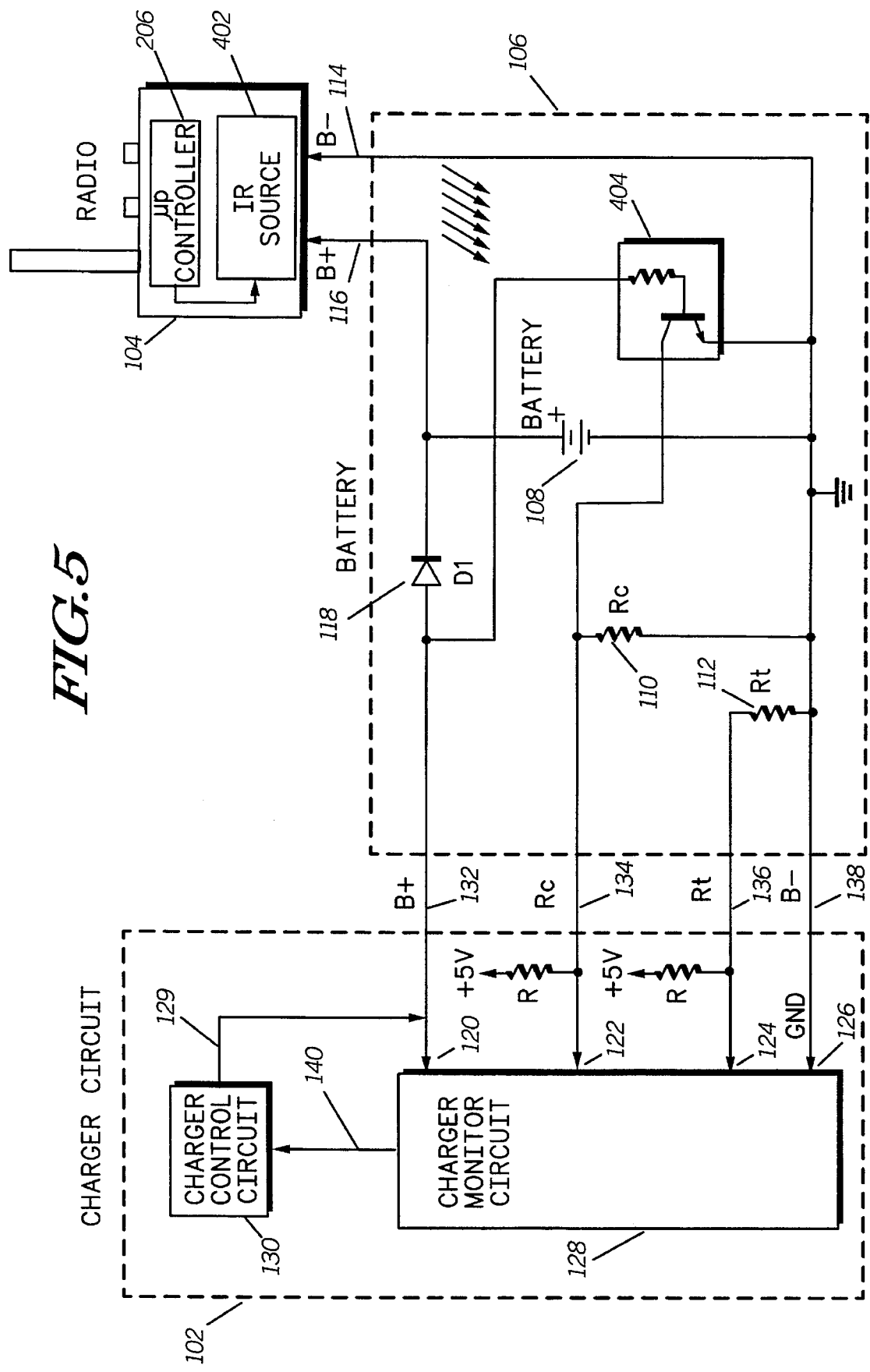
FIG. 5 is a fourth embodiment of a battery charging system in accordance with the invention.

In FIG. 4, a third embodiment of the present invention is shown similar to that shown in FIG. 2, except that in this charger system an optical transmitter such as an infrared transmitter 402 and optical detector such as an infrared detector 404 are used instead of magnetic source and receiver as shown in FIG. 2. FIG. 5 shows a similar infrared system as shown in FIG. 4 except that the infrared detector is shown located in battery 106 instead of charger 102.

In summary, the present invention provides for a way of compensating for changes in radio state without adding additional interconnection points between the radio/battery combination 104, 106 and the charger 102. By adding a Hall-effect switch to the battery capacity line, a means is provided for radio 104 to communicate with charger 102. The period of time that the Rc line is pulled low can then be used to determine the amount of compensation current that is required for battery 106 due to changes in the state of radio 104. The present invention provides for a solution which provides for minimal design changes to existing charger systems, but yet provides for charger compensation based on the state of the radio.

What is claimed is:

1. A battery charging system including a battery charger for charging a battery powered radio having a battery, comprising:

at the radio:

a controller, the controller provides a control signal indicative of the state of the radio;

a magnetic field generator for generating a magnetic field in response to the control signal;

at the battery charger:

a magnetic field reception means for receiving the magnetic field generated by the magnetic field generator and providing a signal to the battery charger indicative of the present state of the radio.

2. A battery charging system as defined in claim 1, wherein the magnetic field reception means comprises a Hall-effect device.

3. A battery charging system as defined in claim 2, wherein the battery charger modifies the amount of charging current provided to the battery based on the signal.

4. A battery charging system as defined in claim 3, wherein the amount of time the magnetic field generator provides the magnetic field corresponds to the state of the radio.

5. A battery charging system as defined in claim 1, further comprising at the charger a port at the charger for determining the capacity of the battery; and wherein the signal provided by the magnetic field reception means causes a voltage level present at the port to change voltage level.

6. A battery charging system including a battery charger for charging a battery powered radio having a battery, comprising:

at the radio:
a controller, the controller provides a control signal indicative of the state of the radio;
a magnetic field generator for generating a magnetic field in response to the control signal;

at the battery:
a magnetic field reception means for receiving the magnetic field generated by the magnetic field generator and providing a signal to the battery charger indicative of the present state of the radio.

7. A battery charging system as defined in claim 1, wherein the magnetic field reception means comprises a Hall-effect device.

8. A battery charging system as defined in claim 2, wherein the battery charger modifies the amount of charging current provided to the battery based on the signal.

9. A battery charging system as defined in claim 3, wherein the amount of time the magnetic field generator provides the magnetic field corresponds to the state of the radio.

* * * * *